Patented June 28, 1932

1,865,096

UNITED STATES PATENT OFFICE

SEBASTIAN GASSNER, OF LEVERKUSEN-ON-THE-RHINE, AND BERTHOLD BIENERT, OF COLOGNE-ON-THE-RHINE, GERMANY, ASSIGNORS TO GENERAL ANILINE WORKS, INC., OF NEW YORK, N. Y., A CORPORATION OF DELAWARE

MANUFACTURE OF ALKOXYBENZOPHENONE DI- OR TRICARBOXYLIC ACIDS

No Drawing. Application filed February 7, 1930, Serial No. 426,764, and in Germany February 13, 1929.

The present invention relates to a process for preparing alkoxybenzophenone di- or tricarboxylic acids and to new products obtainable thereby.

We have found that alkoxybenzophenone di- or tricarboxylic acids can easily be prepared in a good yield and in an excellent state of purity by reacting with a water soluble permanganate, such as ammonium-, sodium-, potassium-, calcium permanganate or the like upon a compound of the probable formula

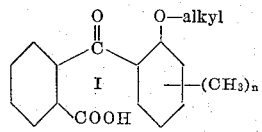

wherein $n$ means one of the numbers 1 or 2 and wherein the benzene nuclei may be further substituted by monovalent substituents, such as hydroxy groups, alkoxy groups, halogen atoms or the like.

The reaction may be performed by introducing the benzophenone monocarboxylic acid into water, adding an alkali, such as soda, potash, caustic soda, ammonia or the like until the benzophenone monocarboxylic acid has dissolved (a slight excess of the alkali being advantageous in many cases) and reacting upon this solution with a water soluble permanganate, especially sodium permanganate at a temperature between about 50–100° C. The permanganate is advantageously applied in an amount surmounting that being theoretically necessary for the oxidation of the methyl groups, especially in the case that the starting materials have been applied in a rather impure state. Reaction will be complete within some hours in the most cases, after which time the reaction mixture is filtered and the filtrate acidified. The reaction products which probably correspond to the general formula

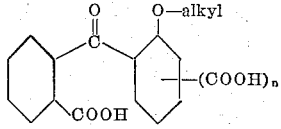

wherein $n$ means one of the numbers 1 or 2 and wherein the benzene nuclei may be substituted as mentioned for the starting materials, separate in a very pure state and in a yield between about 75–100% of the theoretical amount. They form colorless crystals soluble in strong sulfuric acid with a yellow coloration. Obviously instead of the free benzophenone monocarboxylic acids also the alkalimetal salts of the same may be used, addition of an alkali not being necessary in this case.

The starting materials, that is to say the compounds of the general Formula I may be prepared, for example, by reacting with a substituted or unsubstituted phthalic anhydride upon a cresol or xylenole in the presence of aluminium chloride/sodium chloride at 120–150° C. or in the presence of aluminium chloride with the addition of suitable solvents, such as trichlorobenzene, acethylene tetrachloride or the like at a temperature of about 100–150° C. or in the presence of boric acid at 80–210° C, and alkylating the reaction products, for example, by means of dimethyl sulfate in the presence of caustic soda lye at about 80–100° C.

The following examples illustrate our invention without restricting it thereto, the parts being by weight.

Example 1

10 parts of 4'-methoxy-5'-methyl-benzoyl-o-benzoic acid of a melting point of 185–187° C. (obtainable from 4'-hydroxy-5'-methyl-benzoyl-o-benzoic acid of a melting point of 229–230° C. by treating same with dimethyl sulfate or p-toluenesulfonic acid ether in the presence of caustic soda lye, or by condensing o-cresol methylether with phthalic anhydride) are dissolved in 10–20 parts of water with the calculated or a surplus quantity of soda or caustic soda lye, and the solution is oxidized for 1–1½ hours with 15–18 parts of potassium permanganate, being introduced in small portions, at a temperature of 70–100° C. The surplus potassium permanganate is decomposed by the addition of bisulfite, the reaction mass is filtered from pyrolusite, the acid formed precipitated from the filtrate with hydrochloric acid while boiling, and the crystallized acid is filtered off after cooling. The 4'-methoxy-benzophenone-2.5'-dicarboxylic acid thus obtained melts at 234–235° C.

Example 2

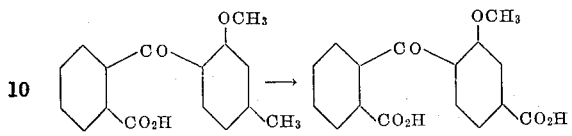

10 parts of 2'-methoxy-4'-methyl-benzoyl-o-benzoic acid of a melting point of 115° C. (obtainable from 2'-hydroxy-4'-methyl-benzoyl-o-benzoic acid of a melting point of 211–213° C. by treating same with dimethyl sulfate or p-toluenesulfonic acid methylether in the presence of caustic soda lye) are dissolved in 10–20 parts of water and oxidized as described in Example 1. The 2'-methoxy-benzophenone-2.4'-dicarboxylic acid thus formed melts at 249–250° C.

Example 3

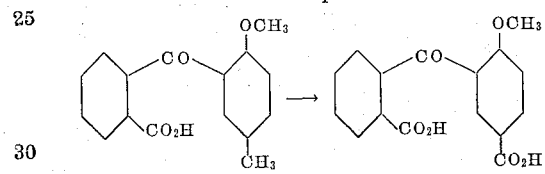

10 parts of 2'-methoxy-5'-methyl-benzoyl-o-benzoic acid of a melting point of 156–158° C. (obtainable by treating 2'-hydroxy-5'-methyl-benzoyl-o-benzoic acid of a melting point of 196–197° C. with dimethyl sulfate or p-toluenesulfonic acid methylether in the presence of caustic soda lye or by condensing p-cresolmethylether with phthalic anhydride) are dissolved in 10–20 parts of water and oxidized as described in Example 1. The 2'-methoxy-benzophenone-2.5'-dicarboxylic acid thus obtained melts at 238–239° C.

Example 4

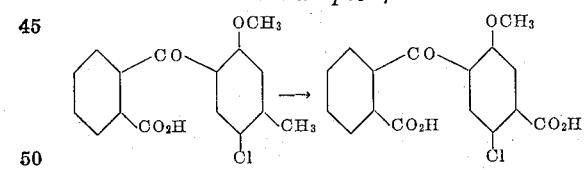

10 parts of 2'-methoxy-4'-methyl-5'-chlorobenzoyl-o-benzoic acid of a melting point of 172–173° C. (obtainable from 2'-hydroxy-4'-methyl-5'-chlorobonzoyl-o-benzoic acid of a melting point of 205–207° C. by treating same with dimethylsulfate or p-toluenesulfonic acid methylether in the presence of caustic soda lye or by condensing p-chloro-m-cresol methylether with phthalic anhydride) are dissolved in 10–20 parts of water and oxidized with 14–20 parts of potassium permanganate for 1½–2 hours at 70–100° C. After decomposition of the surplus potassium permanganate by the addition of bisulfite, the reaction mass is filtered from pyrolusite and the acid formed precipitated from the filtrate with hydrochloric acid while boiling. The colorless 2'-methoxy-5'-chloro-benzophenone-2.4'-dicarboxylic acid thus obtained melts at 202–204° C.

Example 5

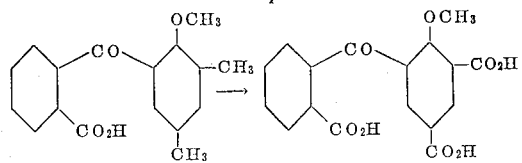

10 parts of 2'-methoxy-3'.5'-dimethyl-benzoyl-o-benzoic acid of a melting point of 123–126° C. (obtainable from 2'-hydroxy-3'.5'-dimethyl-benzoyl-o-benzoic acid of a melting point of 173–174° C. by treating same with dimethyl sulfate or p-toluene sulfonic acid methyl ether in the presence of caustic soda lye) are dissolved in 10–20 parts of water and the solution is oxidized for 1½–2 hours with 30–40 parts of potassium permanganate, at a temperature of 70–100° C. After decomposition of the surplus potassium permanganate, the reaction mass is filtered from pyrolusite and strongly acidified with hydrochloric acid while boiling. The 2'-methoxy-benzophenone-2.3'.5'-tricarboxylic acid crystallizing out after cooling melts at 140–142° C.

Example 6

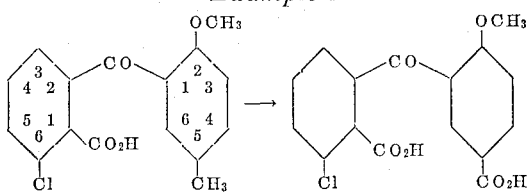

10 parts of 2'-methoxy-5'methyl-6-chlorobenzoyl-2-benzoic acid of a melting point of 186–187° C. (obtainable from 2'-hydroxy-5'-methyl-6-chloro-benzoyl-2-benzoic acid of a melting point of 257–258° C. by treating same with dimethylsulfate in the presence of caustic soda lye) are dissolved in 30–40 parts of water with 3, 4–3, 6 parts of soda and the solution is oxidized for 3–4 hours with 15–16 parts of potassium permanganate at 80–90° C. The surplus potassium permanganate is decomposed by the addition of bisulfite, the reaction mass is filtered from pyrolusite and the filtrate is strongly acidified with hydrochloric acid while boiling. The precipitating 2'-methoxy-6-chlorobenzophenone-2,5'-dicarboxylic acid is filtered off after cooling. It melts at 294–296° C.

Example 7

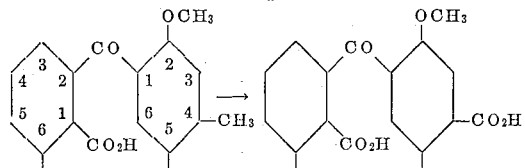

10 parts of 2'-methoxy-4'-methyl-6.5'-dichlorobenzoyl-2-benzoic acid of a melting point of 198-200° C. (obtainable from 2'-hydroxy-4'-methyl-6,5'-dichloro-benzoyl-2-benzoic acid of a melting point of 232° C. by treating same with dimethylsulfate in the presence of caustic soda lye) are dissolved in 50-60 parts of water with 3, 2-3, 4 parts of soda and the solution is oxidized for 6-8 hours with 14-15 parts of potassium permanganate, at a temperature of 80-90° C. The surplus potassium permanganate is decomposed by the addition of bisulfite, the reaction mass is filtered from pyrolusite and the filtrate is strongly acidified with hydrochloric acid while boiling. The precipitating 2'-methoxy-6.5'-dichlorobenzophenone-2,4'-dicarboxylic acid is filtered off after cooling. It melts at 219-221° C.

We claim:—

1. Process which comprises reacting upon a compound of the probable general formula

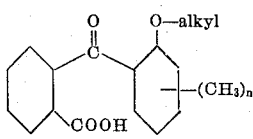

wherein $n$ means one of the numbers 1 or 2 and wherein the benzene nuclei may be further substituted by substituents of the group consisting of halogen atoms and alkoxy groups, with a water soluble permanganate in the presence of water and with the addition of an alkali at a temperature between about 50-100° C.

2. Process which comprises reacting upon a compound of the probable general formula

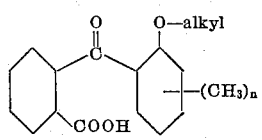

wherein $n$ means one of the numbers 1 or 2 and wherein the benzene nuclei may be further substituted by halogen atoms with potassium permanganate in the presence of water and with the addition of an alkali at a temperature between about 50-100° C.

3. Process which comprises reacting upon the compound of the probable formula

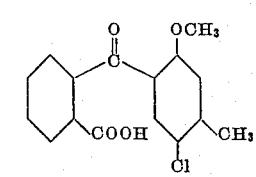

with potassium permanganate in the presence of water and an alkali at a temperature between 70-100° C.

4. The products of the probable general formula

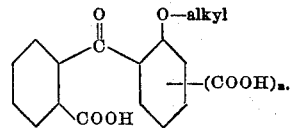

wherein $n$ means one of the numbers 1 or 2 and wherein the benzene nuclei may be further substituted by substituents of the group consisting of halogen atoms and alkoxy groups, said products forming colorless crystals soluble in strong sulfonic acid with a yellow coloration.

5. The product of the probable formula

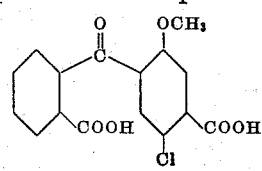

said product forming colorless crystals, melting at 202-204° C. soluble in strong sulfuric acid with a yellow coloration.

In testimony whereof we affix our signatures.

SEBASTIAN GASSNER.
BERTHOLD BIENERT.